United States Patent
Aida et al.

(10) Patent No.: US 11,561,461 B2
(45) Date of Patent: Jan. 24, 2023

(54) LIGHT SOURCE APPARATUS AND IMAGE PROJECTION APPARATUS

(71) Applicant: CANON KABUSHIKI KAISHA, Tokyo (JP)

(72) Inventors: Tomohisa Aida, Utsunomiya (JP); Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/946,059

(22) Filed: Jun. 4, 2020

(65) Prior Publication Data

US 2020/0393747 A1  Dec. 17, 2020

(30) Foreign Application Priority Data

Jun. 12, 2019  (JP) .............................. JP2019-109754

(51) Int. Cl.
*G03B 21/20* (2006.01)
*H04N 9/31* (2006.01)

(52) U.S. Cl.
CPC ....... *G03B 21/204* (2013.01); *G03B 21/2013* (2013.01); *H04N 9/3158* (2013.01); *H04N 9/3161* (2013.01); *H04N 9/3164* (2013.01)

(58) Field of Classification Search
CPC .............. G03B 21/2013; G03B 21/204; G03B 21/2066; H04N 9/3158; H04N 9/3161; H04N 9/3164
See application file for complete search history.

(56) References Cited

U.S. PATENT DOCUMENTS 9,632,403 B2 *  4/2017  Inoko .................... F21V 13/14
9,851,631 B2 * 12/2017  Inoko .................... G02B 13/16
(Continued)

FOREIGN PATENT DOCUMENTS

CN        1901186 A    1/2007
CN      102645829 A    8/2012
(Continued)

OTHER PUBLICATIONS

Notice on the First Office Action issued by the National Intellectual Property Administration of the People's Republic of China dated Oct. 11, 2021 in corresponding CN Patent Application No. 202010442599.X, with English translation.
(Continued)

*Primary Examiner* — Magda Cruz
(74) *Attorney, Agent, or Firm* — Carter, DeLuca & Farrell LLP

(57) ABSTRACT

A light source apparatus includes a first light source configured to emit first color light, a second light source configured to emit second color light having a different wavelength from that of the first color light, a wavelength conversion element configured to convert the first color light into third color light having a wavelength different from that of the first color light and to emit the third color light, and to emit the second color light as it is, and an optical system including a light guide surface configured to guide the first color light from the first light source and the second color light from the second light source to the wavelength conversion element, and the optical system being configured to emit combined light of the second color light and the third color light from the wavelength conversion element.

8 Claims, 10 Drawing Sheets

(56) References Cited

U.S. PATENT DOCUMENTS

| | | | | |
|---|---|---|---|---|
| 10,133,169 B2* | 11/2018 | Kawasumi | ......... | G03B 21/2066 |
| 2014/0285774 A1* | 9/2014 | Tajiri | ................ | G03B 21/2066 |
| | | | | 353/38 |
| 2015/0219314 A1* | 8/2015 | Inoko | ................... | H04N 9/3158 |
| | | | | 362/84 |
| 2016/0084478 A1* | 3/2016 | Inoko | ...................... | F21V 13/14 |
| | | | | 362/343 |
| 2017/0153538 A1* | 6/2017 | Kawasumi | ............. | G02B 27/10 |
| 2017/0307969 A1* | 10/2017 | Kawasumi | ......... | G03B 21/2066 |
| 2018/0067385 A1* | 3/2018 | Nakada | ................ | G03B 21/208 |
| 2018/0149956 A1* | 5/2018 | Kawasumi | ......... | G03B 21/2013 |
| 2020/0021783 A1 | 1/2020 | Kawasumi | | |
| 2020/0124952 A1* | 4/2020 | Guo | ..................... | G03B 21/204 |
| 2020/0124955 A1* | 4/2020 | Hu | ........................ | G03B 21/204 |
| 2020/0285138 A1* | 9/2020 | Kurata | ............... | G03B 21/2066 |

FOREIGN PATENT DOCUMENTS

| | | | | | |
|---|---|---|---|---|---|
| CN | 102830582 A | 12/2012 | | | |
| CN | 103052841 A | 4/2013 | | | |
| CN | 103869590 A | 6/2014 | | | |
| CN | 104820335 A | 8/2015 | | | |
| CN | 106842789 A | 6/2017 | | | |
| CN | 108572498 A | 9/2018 | | | |
| CN | 109765745 A | * | 5/2019 | ............ | G03B 21/10 |
| JP | 5928383 B2 | 6/2016 | | | |
| JP | 5979416 B2 | 8/2016 | | | |
| JP | 2017215496 A | 12/2017 | | | |
| JP | 2019061082 A | 4/2019 | | | |

OTHER PUBLICATIONS

Notice on the Second Office Action issued by the National Intellectual Property Administration of the People's Republic of China dated Apr. 22, 2022 in corresponding CN Patent Application No. 202010442599.X, with English translation.

* cited by examiner

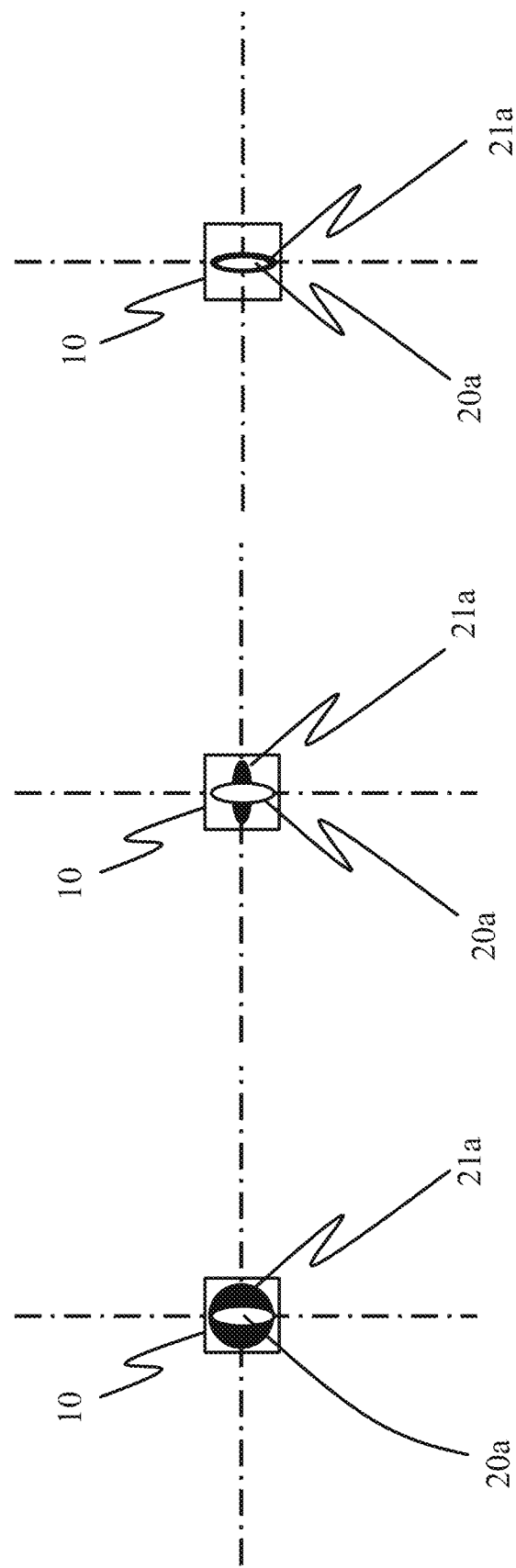

LIGHT SOURCE APPARATUS AND IMAGE PROJECTION APPARATUS

BACKGROUND OF THE INVENTION

Field of the Invention

The present invention relates to a light source apparatus suitable for an image projection apparatus (projector), etc.

Description of the Related Art

Some projectors emit, as excitation light, light emitted from a laser diode to a phosphor (fluorescent member), guides illumination light including fluorescent light generated by the wavelength conversion by the phosphor to a light modulation element to modulate it, and projects an image.

The projectors are demanded for a color reproduction based on the color standard such as sRGB and DCI. However, a material having a proper emission spectrum has not yet been practically used as a material for the phosphor. Hence, Japanese Patents Nos. ("JPs") U.S. Pat. Nos. 5,979,416 and 5,928,383 disclose a projector provided with an auxiliary light source separate from the phosphor in order to compensate for a light amount in a wavelength region that runs short in the fluorescent light alone.

However, in the projectors disclosed in JPs 5979416 and 5928383, in a wavelength region where the spectrum of the fluorescent light emitted from the phosphor and the spectrum of the light from the added auxiliary light source are superimposed, only one of them can be used and the light use efficiency is low.

SUMMARY OF THE INVENTION

The present invention provides a light source apparatus and an image projection apparatus using the same, each of which can improve a color reproducibility using an auxiliary light source and effectively utilize a spectrum of converted light from a wavelength conversion element.

A light source apparatus according to one aspect of the present invention includes a first light source configured to emit first color light, a second light source configured to emit second color light having a different wavelength from that of the first color light, a wavelength conversion element configured to convert the first color light into third color light having a wavelength different from that of the first color light and to emit the third color light, and to emit the second color light as it is, and an optical system including a light guide surface configured to guide the first color light from the first light source and the second color light from the second light source to the wavelength conversion element, and the optical system being configured to emit combined light of the second color light and the third color light from the wavelength conversion element. An image projection apparatus having the above light source apparatus also constitutes another aspect of the present invention.

Further features of the present invention will become apparent from the following description of exemplary embodiments with reference to the attached drawings.

BRIEF DESCRIPTION OF THE DRAWINGS

FIGS. 15A to 15C explain a sixth embodiment of the present invention.

DESCRIPTION OF THE EMBODIMENTS

Referring now to the accompanying drawings, a description will be given of embodiments according to the present invention.

First Embodiment

Figure 1:
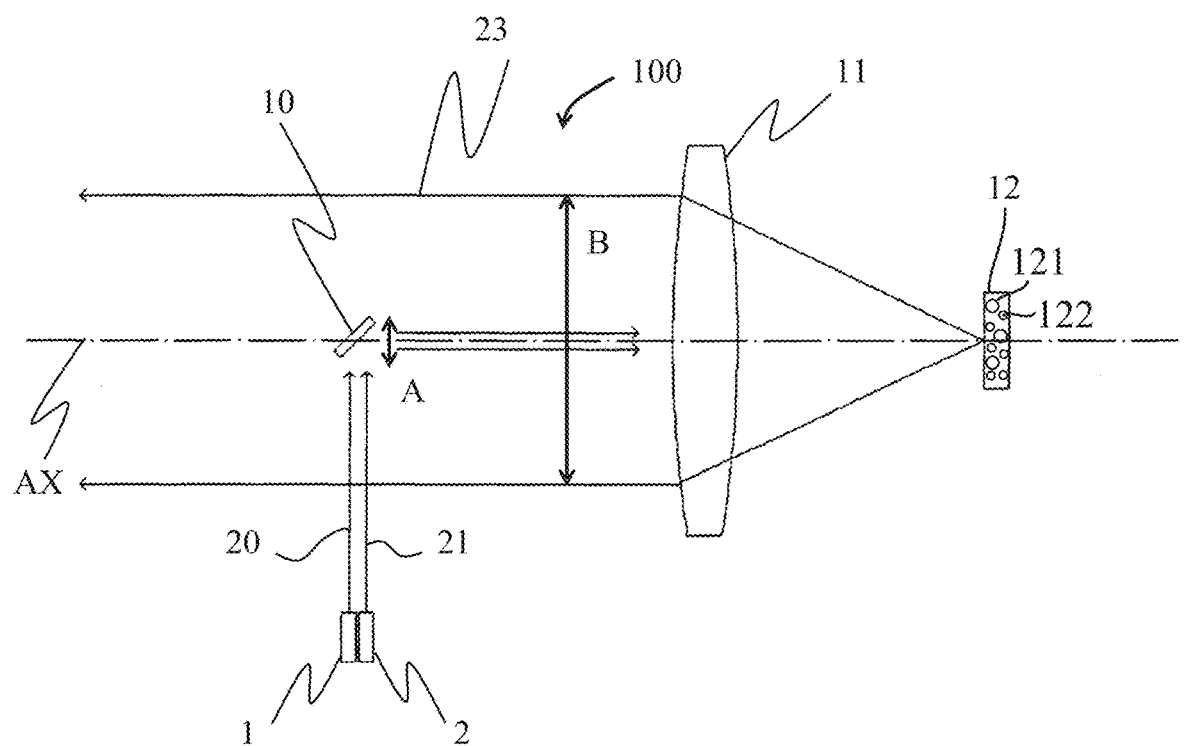
FIG. 1 illustrates a configuration of a light source apparatus according to a first embodiment of the present invention.

FIG. 1 illustrates a configuration of a light source apparatus 100 according to a first embodiment of the present invention. Reference numeral 1 denotes a first light source as an excitation light source that emits blue light (first color or colored light), and reference numeral 2 denotes a second light source as an auxiliary light source that emits red light (second color light) having a wavelength different from that of the blue light. The blue light emitted from the first light source 1 and the red light emitted from the second light source 2 enter a light guide surface 10 disposed on an optical axis AX of a light source apparatus (a condenser lens 11 described later). In this embodiment, a dichroic mirror is used for the light guide surface 10.

Figure 2:
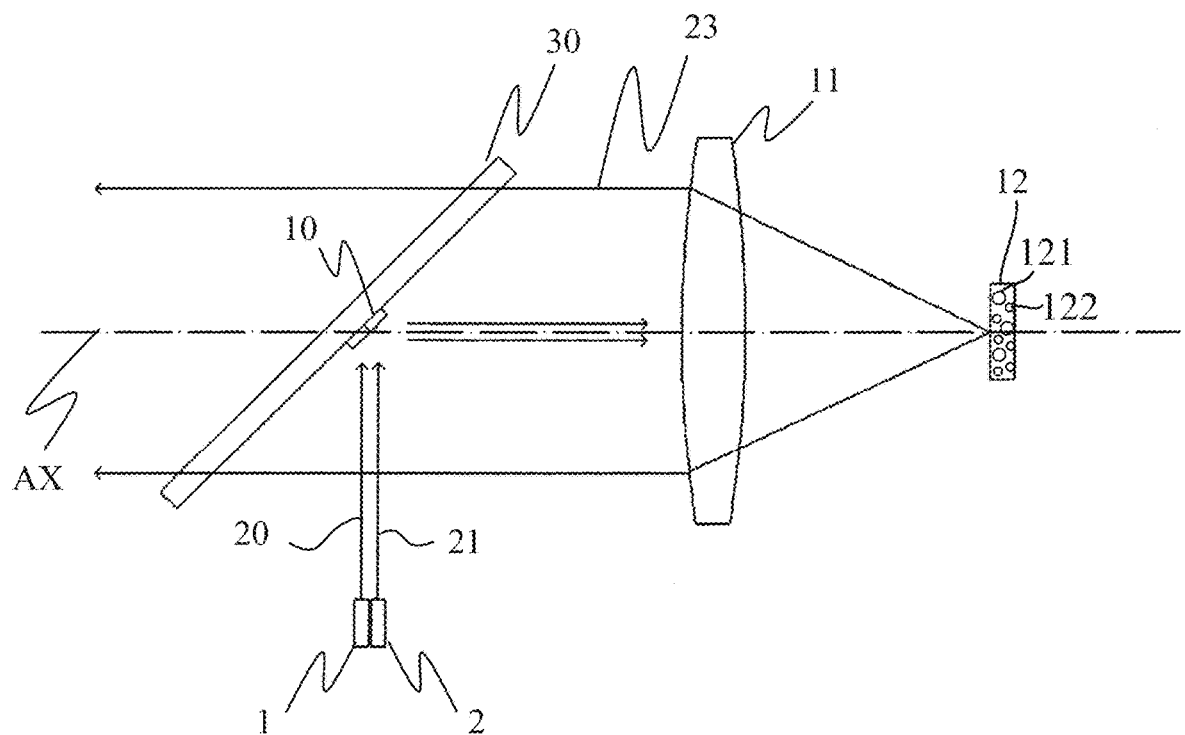
FIG. 2 illustrates a variation of the light source apparatus according to the first embodiment.

The dichroic mirror serving as the light guide surface 10 may be a dichroic coat applied to the entire surface of a substrate such as glass, or a dichroic coat applied to part of a substrate 30 larger than the light beam diameter of light from the condenser lens 11 as illustrated in FIG. 2. This is similarly applied to the light guide surface in another embodiment described later.

Figure 3:
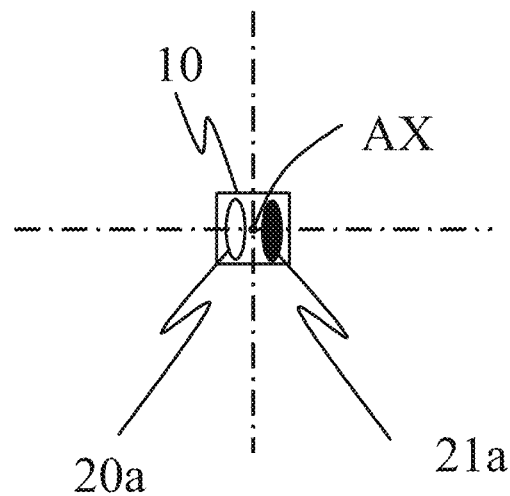
FIG. 3 illustrates a light beam distribution on a light guide surface according to the first embodiment.
Figure 4:
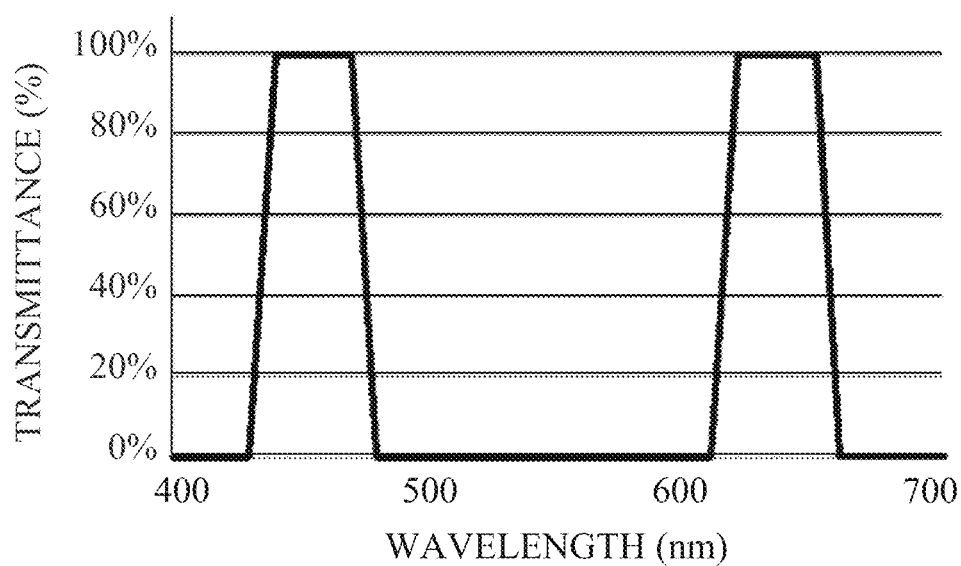
FIG. 4 illustrates a spectral characteristic of a light guide surface according to the first embodiment.

As illustrated in FIG. 3 viewed from the optical axis direction in which the optical axis AX extends (on the side of the condenser lens 11), the blue light 20 from the first light source 1 and the red light 21 from the second light source 2 enter different areas, respectively. The light guide surface 10 is configured as a single surface, and includes a first area 20a which the blue light 20 enters and a second area 21a which the red light 21 enters so that these areas do not overlap each other. As illustrated in FIG. 4, the light guide surface 10 has a characteristic on its entire surface that reflects the blue light having a wavelength of about 440 nm to 470 nm and the red light having a wavelength of about 630 nm to 650 nm, and transmits light having other wavelengths. The light guide surface 10 reflects the blue light 20 and the red light 21 and guides the blue light 20 and the red light 21 to the phosphor 12 as a wavelength conversion element.

Figures 5A, 5B:
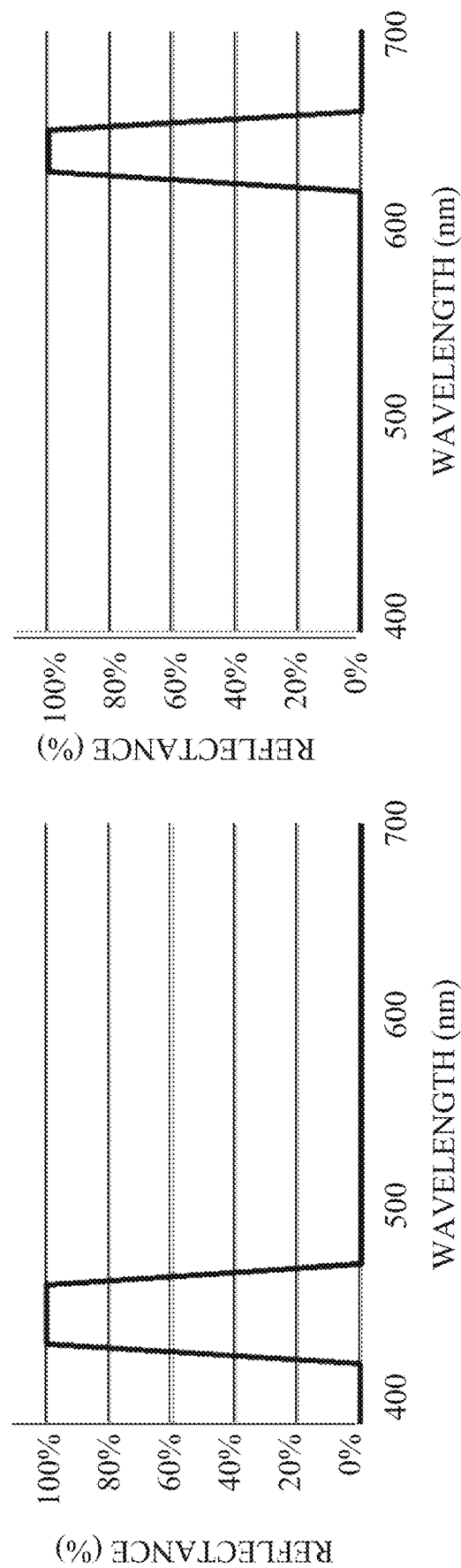
FIGS. 5A and 5B illustrates a spectral characteristic of a light guide surface according to the first embodiment.

The light guide surface 10 may have the following characteristic: The first area which the blue light enters reflects the blue light, and transmits the light having another wavelength, as illustrated in FIG. 5A, and the second area which the red light enters reflects the red light and transmits the light having another wavelength, as illustrated in FIG. 5B. The light guide surface 10 may have a characteristic of transmitting both blue light and red light and of reflecting light having another wavelength.

The blue light 20 and the red light 21 reflected on the light guide surface 10 are condensed toward the phosphor 12 via the condenser lens 11. The condenser lens 11 as a condenser optical system includes one or more of lenses having a positive power, and condenses light from the light guide surface 10 toward the phosphor 12 and, as described later, condenses the light emitted from the phosphor 12 and collimates it. The light guide surface 10 and the condenser lens 11 constitute an optical system.

Part of the blue light 20 (excitation light) that has entered the phosphor 12 is converted by the phosphor 12 into the fluorescent light (converted light) as yellow light (third color light) having a longer wavelength than that of the blue light 20, and the fluorescent light is emitted from the phosphor 12 toward the condenser lens 11. The remaining nonconverted light of the blue light 20 whose wavelength has not been converted is emitted as the blue light toward the condenser lens 11. The phosphor 12 according to this embodiment is a reflection type phosphor, and includes a component (a phosphor component 121) that converts the wavelength of the excitation light and emits the fluorescent light, a component (a diffusive component 122) that diffuses the fluorescent light and the nonconverted light in a direction different from the incident direction of the excitation light, a component holding these components, and a substrate provided with a reflective film.

Figure 6:
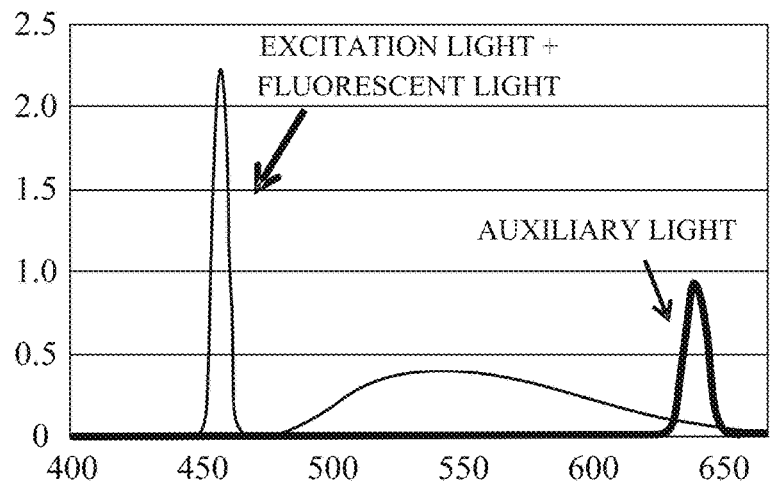
FIG. 6 illustrates a spectrum of light emitted from the light source apparatus according to the first embodiment.

The red light (auxiliary light) that has entered the phosphor 12 is also not subjected to the wavelength conversion and is emitted as the red light toward the condenser lens 11. Thereby, as illustrated in FIG. 6, white light obtained by combining the blue light as the excitation light, the yellow light as the fluorescent light, and the red light as the auxiliary light travels from the phosphor 12 to the condenser lens 11. Then, the white light as the diffused light is collimated by the condenser lens 11 and emitted from the light source apparatus 100 as described above.

At this time, part of the combined light, the blue light and the red light, is reflected by the light guide surface 10 toward the first and second light sources 1 and 2. However, the size of the light guide surface 10 is set such that it is smaller than the light beam diameter of the combined light from the condenser lens 11, and little affects the white color of the combined light. More specifically, the following condition may be satisfied:

$A/B<1.0$ where A is an area of the light guide surface 10 when viewed from the optical axis direction (wavelength conversion element side), and B is a light beam area of the combined light from the condenser lens 11.

The light reflected by the light guide surface 10 towards the sides of the first light source 1 and the second light source 2 becomes losses. In order to reduce the loss as low as possible, the following condition may be satisfied:

$A/B \leq 0.5$.

In order to reduce the color unevenness of the combined light in which multiple colored lights are combined, the following condition may be satisfied:

$A/B \leq 0.2$.

Figure 16:
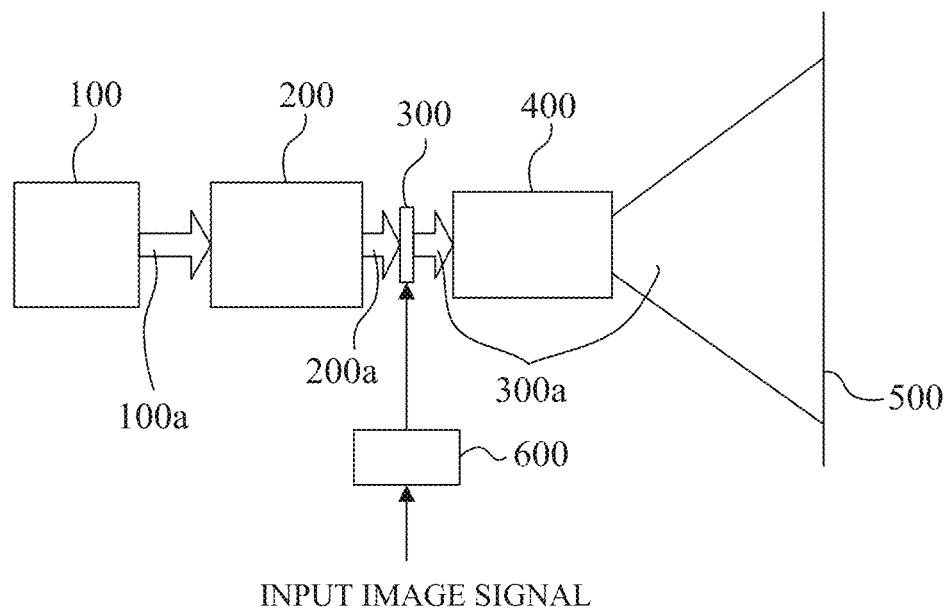
FIG. 16 illustrates a configuration of a projector including the light source apparatus according to each embodiment.

FIG. 16 illustrates a configuration of a projector as an image projection apparatus including the light source apparatus 100 according to this embodiment. White light 100a emitted from the light source apparatus 100 is converted into illumination light 200a by an illumination optical system 200 and enters a light modulation element 300. The illumination optical system 200 generates the illumination light 200a by converting the white light 100a as unpolarized light from the light source apparatus 100 into linearly polarized light, by converting the white light 100a into light that forms an irradiation area having an even luminance on the light modulation element 300, and by separating the white light 100a into three-color RGB light beams.

The light modulation element 300 includes a transmission type or reflection type liquid crystal panel, a digital micromirror device, or the like. A drive circuit 600 drives the light modulation element 300 according to an image signal input from the outside. Thereby, the light modulation element 300 modulates the illumination light 200a according to the input image signal and generates image light 300a. The image light 300a is projected onto a projection surface (target surface) 500 such as a screen via a projection optical system 400. The projection optical system 400 combines the color-separated image light 300a and enlarges the image light 300a. Thereby, a projection image as a color image is displayed.

In the projector illustrated in FIG. 16, a light source apparatus of another embodiment described later may be used instead of the light source apparatus 100 according to this embodiment.

Second Embodiment

Figure 7:
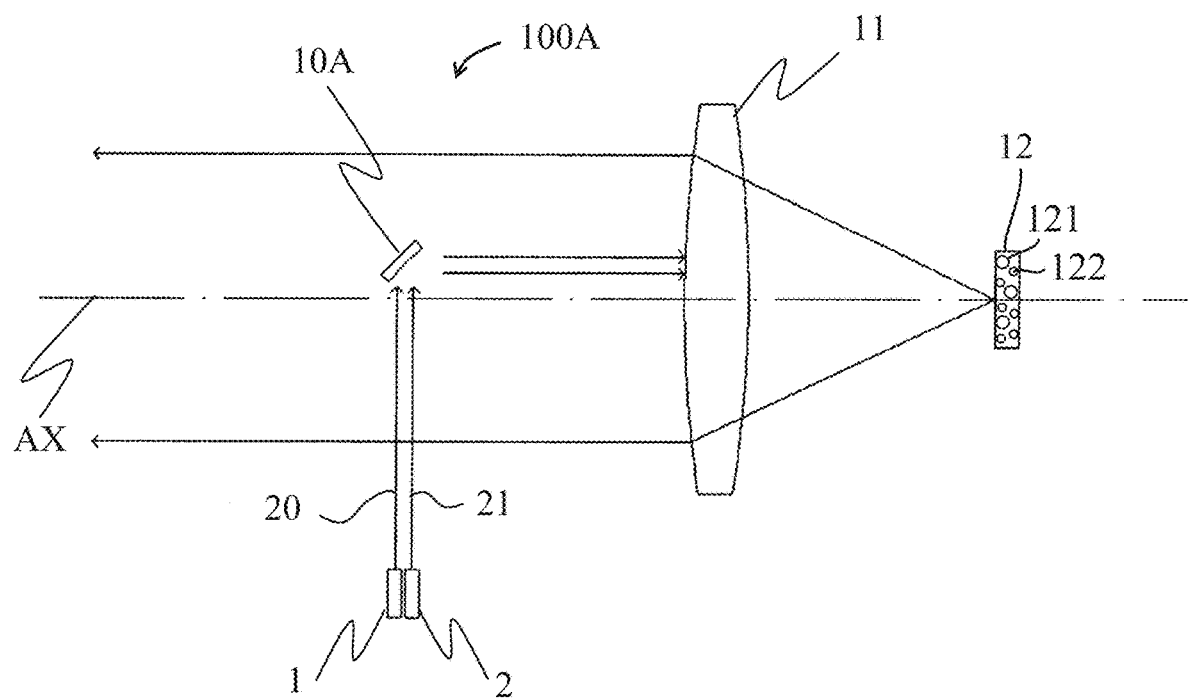
FIG. 7 illustrates a configuration of a light source apparatus according to a second embodiment of the present invention.

FIG. 7 illustrates a configuration of a light source apparatus 100A according to a second embodiment of the present invention. The light source apparatus 100A according to this embodiment is different from the light source apparatus 100 according to the first embodiment in the arrangement of the light guide surface 10A, and other than that, they are similar to each other and those elements which are corresponding element in the first embodiment will be designated by the same reference numerals as those of the first embodiment.

Figure 8:
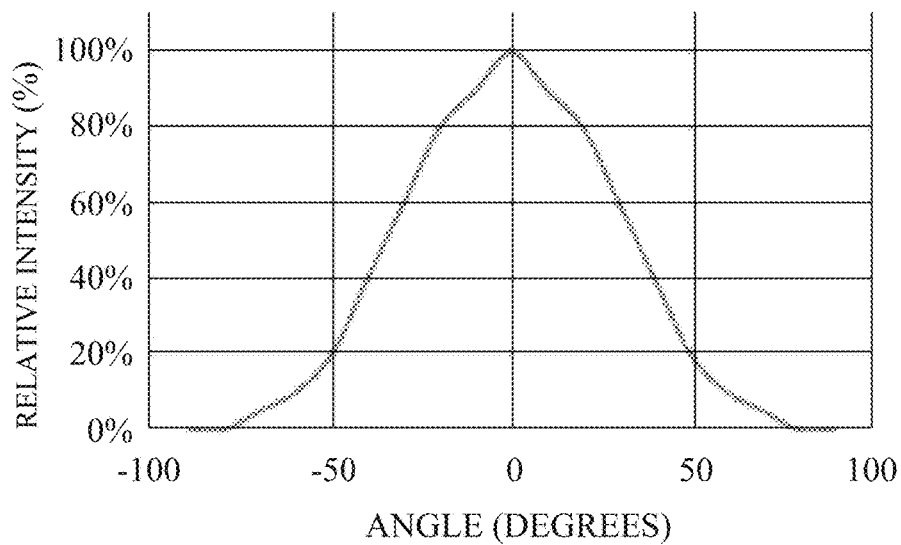
FIG. 8 illustrates an intensity distribution of light emitted from a phosphor according to a second embodiment.

As described in the first embodiment, part of the combined light from the condenser lens 11 is reflected by the light guide surface 10 and becomes a loss. When the light emitted from the phosphor 12 has a uniform intensity within a plane orthogonal to the optical axis AX, the loss is constant regardless of the position of the light guide surface 10. However, assume that the light emitted from the phosphor 12 has the highest intensity on the optical axis AX (at an angle of 0 degree) as illustrated in FIG. 8 and becomes weaker as the distance from the optical axis AX increases.

Then, when the light guide surface 10 is placed on the optical axis AX, the loss becomes larger.

Thus, this embodiment reduces the loss by decentering the light guide surface 10A from the optical axis AX or by disposing the light guide surface 10A at a position away from the optical axis AX. Although FIG. 7 illustrates the eccentricity in the in-plane direction of the paper plane, the eccentricity to the optical axis AX may be in the depth direction (not shown) of the paper plane.

Third Embodiment

Figure 9:
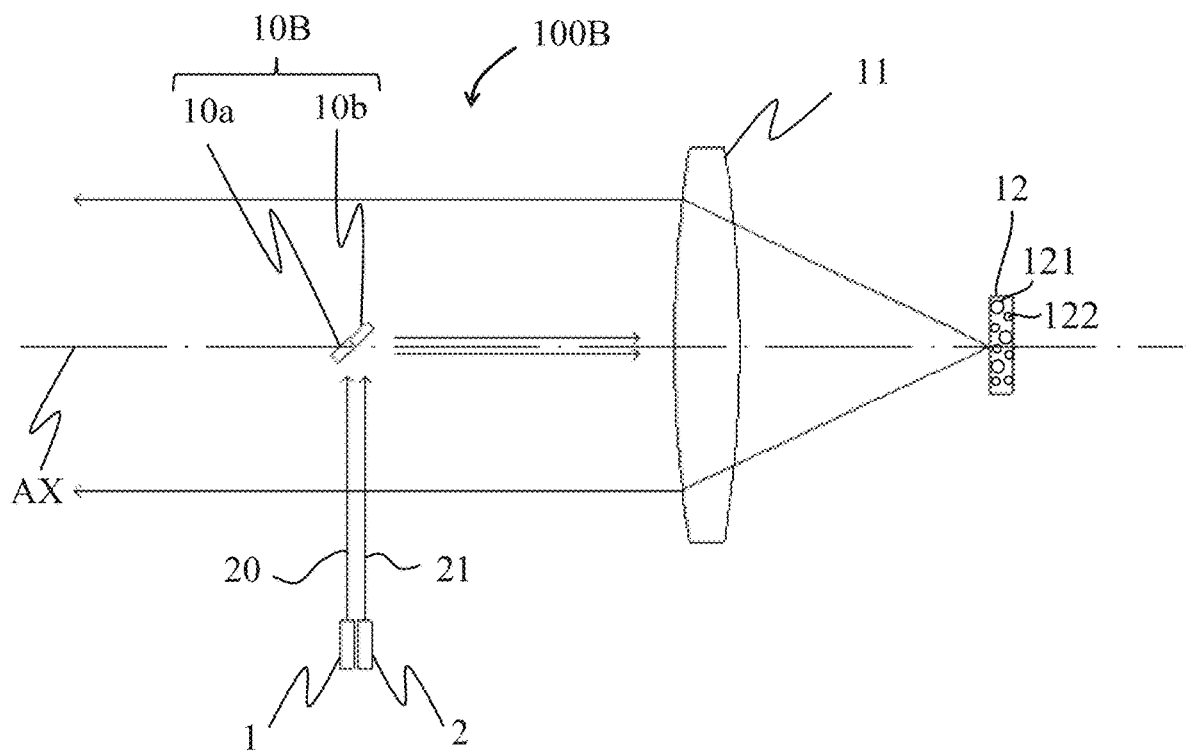
FIG. 9 illustrates a configuration of a light source apparatus according to a third embodiment of the present invention.

FIG. 9 illustrates a configuration of a light source apparatus 100B according to a third embodiment of the present invention. Since the light source apparatus 100B according to this embodiment is the same as the light source apparatus 100 according to the first embodiment except for the configuration of the light guide surface 10B, those elements which are corresponding element in the first embodiment will be designated by the same reference numerals as those of the first embodiment.

Figure 10:
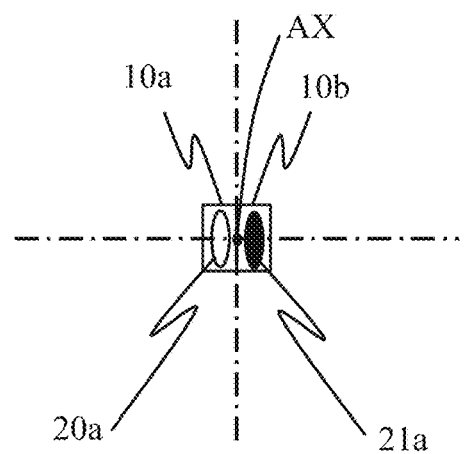
FIG. 10 illustrates a light beam distribution on a light guide surface according to the third embodiment.

The light guide surface 10B according to this embodiment is also disposed on the optical axis AX, similar to the first embodiment. According to the first embodiment, the light guide surface 10 is the single surface. On the other hand, as illustrated in FIG. 10 viewed from the optical axis direction, the light guide surface 10B according to this embodiment includes a first guide surface 10a having a first area 20a that receives the blue light 20 from the first light source 1 and guides the blue light 20 to the phosphor 12, and a second guide surface 10b having a second area 21a that receives the red light 21 from the second light source 2 and guides the red light 21 to the phosphor 12. The first light guide surface 10a and the second light guide surface 10b have the characteristics illustrated in FIGS. 5A and 5B, respectively.

Fourth Embodiment

Figure 11:
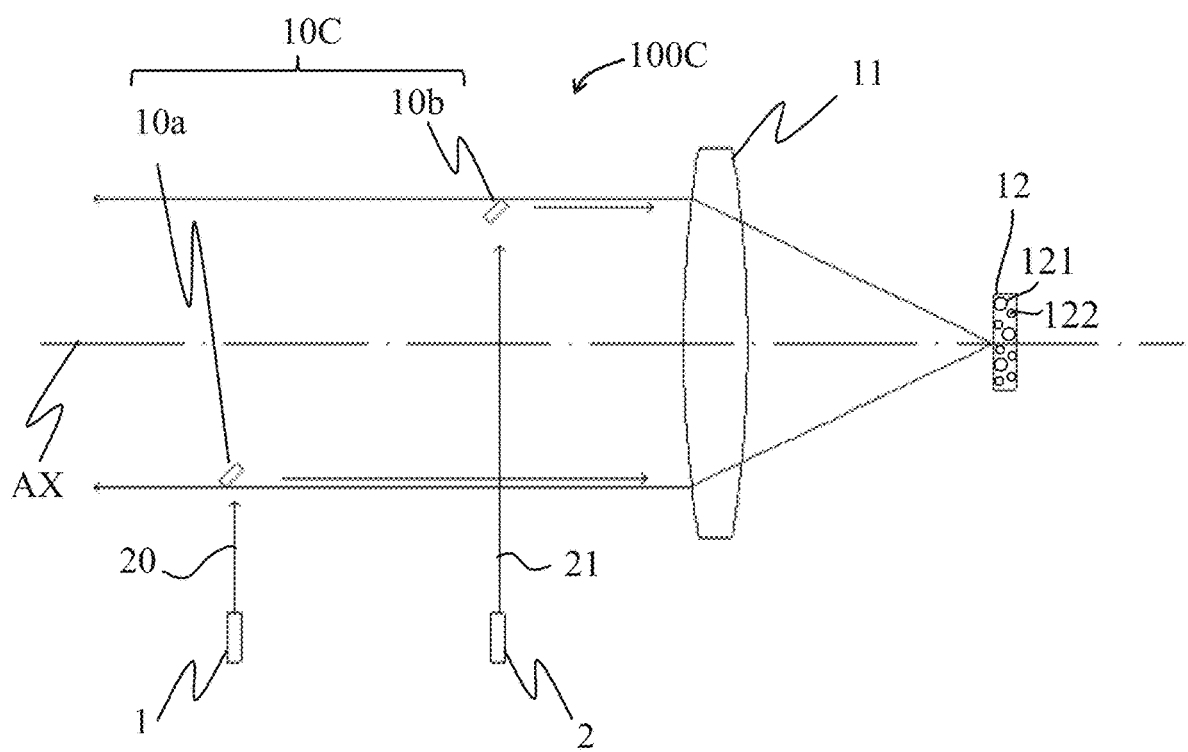
FIG. 11 illustrates a configuration of a light source apparatus according to a fourth embodiment of the present invention.

FIG. 11 illustrates a configuration of a light source apparatus 100C according to a fourth embodiment of the present invention. Since the light source apparatus 100C according to this embodiment is the same as the light source apparatus 100B according to the third embodiment except for the configuration of the light guide surface 10C, those elements which are corresponding element in the first embodiment will be designated by the same reference numerals as those of the first embodiment.

Similar to the second embodiment, the light guide surface 10C according to this embodiment also includes the first guide surface 10a having the first area 20a that receives the blue light 20 from the first light source 1 and guides the blue light 20 to the phosphor 12, and the second guide surface 10b having the second area 21a that receives the red light 21 from the second light source 2 and guides the red light 21 to the phosphor 12. However, this embodiment disposes both the first light guide surface 10a and the second light guide surface 10b at positions eccentric to the optical axis AX or at positions away from the optical axis AX. The first light guide surface 10a and the second light guide surface 10b are disposed positions separated from each other.

As described above, since the first and second light guide surfaces 10a and 10b are separated from each other, and disposed at positions eccentric to the optical axis AX, each light guide surface has a smaller area and the light loss on each light guide surface can be made smaller. Although FIG. 11 illustrates the eccentricity in the in-plane direction of the paper plane, the eccentricity in the depth direction (not shown) of the paper plane relative to the optical axis AX may be used.

Fifth Embodiment

Figure 12:
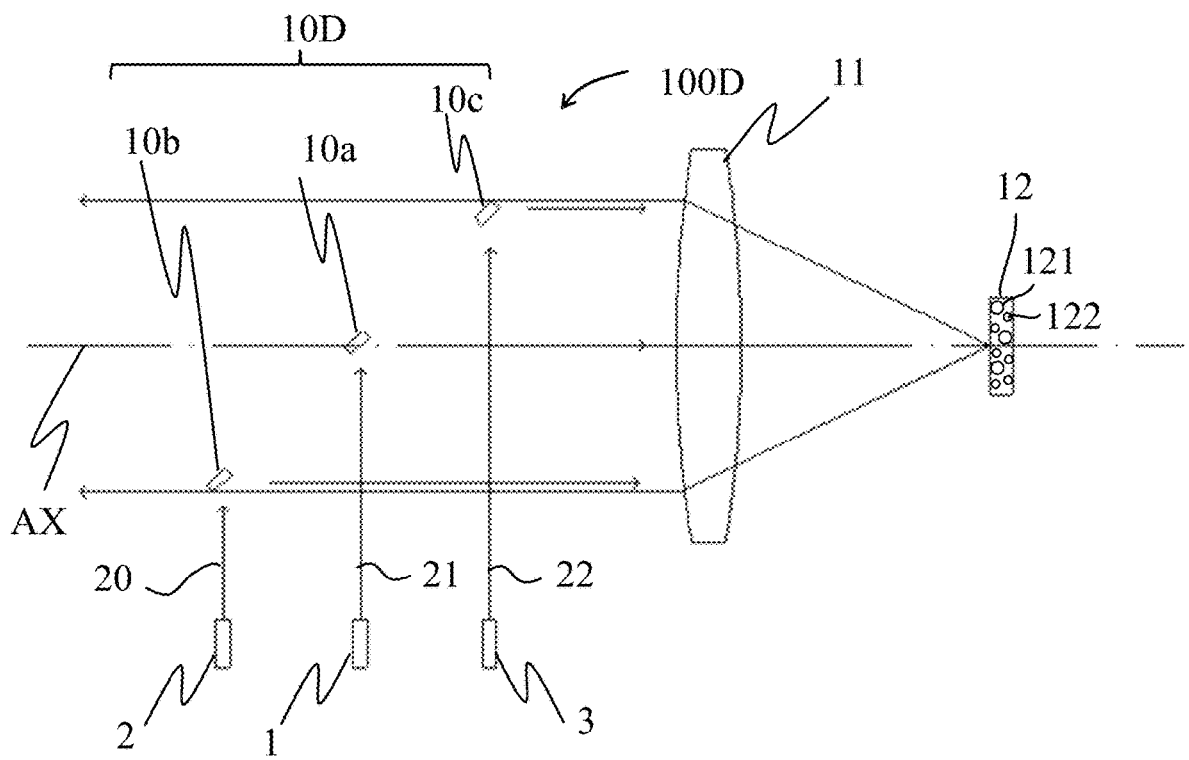
FIG. 12 illustrates a configuration of a light source apparatus according to a fifth embodiment of the present invention.

FIG. 12 illustrates a light source apparatus 100D according to a fifth embodiment of the present invention. Since the light source apparatus 100D according to this embodiment is the same as the light source apparatus 100C according to the fourth embodiment except for having a third light source 3 and the configuration of a light guide surface 10D, those elements which are corresponding element in the fourth embodiment will be designated by the same reference numerals as those of the fourth embodiment.

Figure 13:
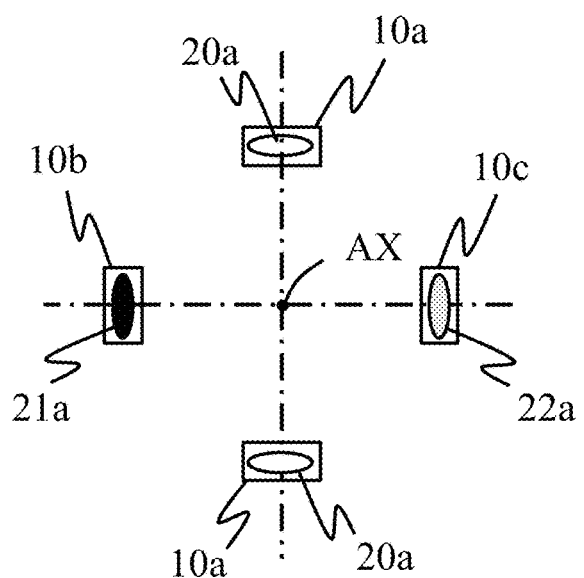
FIG. 13 illustrates a light beam distribution on a light guide surface according to the fifth embodiment.

The light source apparatus 100D according to this embodiment has the third light source 3 as an auxiliary light source that emits green light 22 in addition to the second light source 2 that emits red light 21. The light guide surface 10D has the first light guide surface 10a and the second light guide surface 10b which are separated from each other and eccentric to the optical axis AX, respectively, similar to the fourth embodiment. While FIG. 12 illustrates the first light guide surface 10a is located on the optical axis AX, it is actually disposed at a position eccentric from the optical axis AX, as illustrated in FIG. 13 viewed from the optical axis direction.

The light guiding surface 10D further includes a third light guiding surface 10c having a third area 22a which receives the green light 22 from the third light source 3 and guides the green light 22 to the phosphor 12. The third light guide surface 10c is disposed at a position distant from the first and second light guide surfaces 10a and 10b, and eccentric to the optical axis AX.

Figures 14A, 14B, 14C:
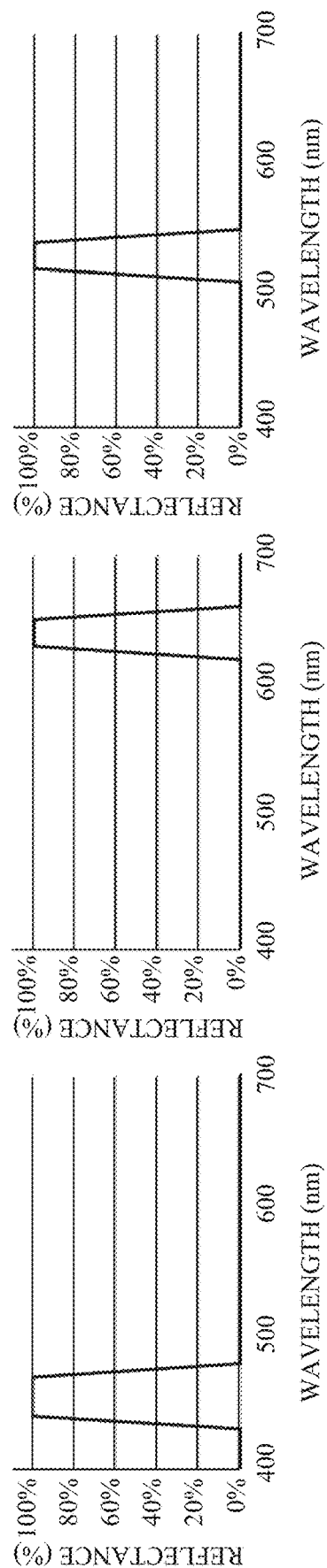
FIGS. 14A to 14C illustrate spectral characteristics on a light guide surface according to the fifth embodiment.

As illustrated in FIGS. 14A and 14B, the first light guide surface 10a and the second light guide surface 10b have the same characteristics as those illustrated in FIGS. 5A and 5B, respectively. On the other hand, as illustrated in FIG. 14C, the third light guide surface 10c has a characteristic of reflecting the green light having a wavelength of about 520 nm to about 540 nm and of transmitting other color light.

The green light 22 as auxiliary light that has entered the phosphor 12 is emitted as green light toward the condenser lens 11 without the wavelength conversion similar to the red light. The green light is combined with the blue light (unconverted light), the yellow light (fluorescent light), and the red light (auxiliary light) similarly emitted from the phosphor 12 to form white light, and emitted from the light source apparatus 100D.

The green light 22 in this embodiment can be treated as the second color light together with the red light 21, and the third light source 3 and the third light guide surface 10c (third light guide surface 22a) provided for the green light 22 may also be treated as the second light source and the second light guide surface (second area), respectively. Alternatively, the green light 22 may be treated as fourth color light.

Sixth Embodiment

FIGS. 15A to 15C illustrate a light guide surface 10 in a light source apparatus according to a sixth embodiment of the present invention viewed from the optical axis direction. The light guide surface 10 is a single surface similar to the first embodiment, and has a first area 20a that receives the blue light 20 and a second area 20a that receives the red light 21 in this single surface. While the first embodiment sets the first and second areas 20a and 21a so that they do not overlap each other, this embodiment sets the first and second areas 20a and 21a so that they at least partially overlap each other, as illustrated in FIGS. 15A to 15C.

More specifically, in FIG. 15A, the first area 20a is included in the second area 21a. That is, the entire first area 20a overlaps part of the second area 21a. On the contrary, the first area 20a may include the second area 21a.

In FIG. 15B, part of the first area 20a and part of the second area 21a overlap each other. In FIG. 15C, the entire first area 20a and the entire second area 21a overlap each other. These are merely illustrative, and the first area 20a and the second area 21a may be arbitrarily set.

Each of the above embodiments can provide a highly efficient light source apparatus and projector that provides the second light source(s) 2 (and 3) as the auxiliary light source(s) to improve the color reproducibility, and can maximize the spectrum of the fluorescent light (third color light) as the converted light from the phosphor 12 that is the wavelength conversion element.

The above embodiments have described the phosphor used as the wavelength conversion element, but may use a wavelength conversion element other than the phosphor as long as it converts incident light into light having a different wavelength. Each of the above embodiments has discussed the conversion of only part of the blue light as the excitation light into the fluorescent light, but all of the blue light may be converted into the fluorescent light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-109754, filed on Jun. 12, 2019, which is hereby incorporated by reference herein in its entirety.

What is claimed is:

1. A light source apparatus comprising:
a first light source configured to emit first color light;
a second light source configured to emit second color light having a different wavelength from a wavelength of the first color light;
a wavelength conversion element configured to convert part of the first color light into third color light having a wavelength different from the wavelength of the first color light and to emit the third color light, to emit the rest of the first color light as it is, and to emit the second color light as it is; and
an optical system including a light guide surface configured to guide the first color light from the first light source and the second color light from the second light source to the wavelength conversion element, and the optical system being configured to emit combined light of the rest of the first color light, the second color light and the third color light from the wavelength conversion element,
wherein the wavelength conversion element includes, in a same area where the first color light and the second color light enter, (a) a phosphor component that converts the part of the first color light to the third color light and (b) a diffusive component that diffuses the third color light, the rest of the first color light and the second color light, and
the wavelength conversion element simultaneously emits, from the same area, the rest of the first color light, the second color light, and the third color light.

2. The light source apparatus according to claim 1, wherein the light guide surface includes, in a single surface, a first area which the first color light from the first light source enters and a second area which the second color light from the second light source enters.

3. The light source apparatus according to claim 2, wherein the first area and the second area do not overlap each other.

4. The light source apparatus according to claim 2, wherein the first area and the second area at least partially overlap each other.

5. The light source apparatus according to claim 1, wherein the light guide surface includes a first light guide surface which the first color light from the first light source enters, and a second light guide surface different from the first light guide surface which the second color light from the second light source enters.

6. The light source apparatus according to claim 1, wherein the optical system includes a condenser optical system configured to condense toward the wavelength conversion element, the first color light and the second color light traveling from the light guide surface toward the wavelength conversion element, and collimates the combined light from the wavelength conversion element, and
wherein the light guide surface is disposed eccentrically to an optical axis of the condenser optical system.

7. The light source apparatus according to claim 1, wherein the following condition is satisfied:

$$A/B<1.0$$

where A is an area of the light guide surface when viewed from a side of the wavelength conversion element and B is a light beam area of the combined light.

8. An image projection apparatus comprising:
a light source apparatus; and
a light modulation element configured to modulate light emitted from the light source apparatus according to an input image signal and to generate image light,
wherein the image projection apparatus displays an image by projecting the image light onto a target surface,
wherein the light source apparatus includes:
a first light source configured to emit first color light;
a second light source configured to emit second color light having a different wavelength from a wavelength of the first color light;
a wavelength conversion element configured to convert part of the first color light into third color light having a wavelength different from the wavelength of the first color light and to emit the third color light, to emit the rest of the first color light as it is, and to emit the second color light as it is; and
an optical system including a light guide surface configured to guide the first color light from the first light source and the second color light from the second light source to the wavelength conversion element, and the optical system being configured to emit combined light of the rest of the first color light, the second color light and the third color light from the wavelength conversion element, and
wherein the wavelength conversion element includes, in a same area where the first color light and the second color light enter, (a) a phosphor component that converts the part of the first color light to the third color light and (b) a diffusive component that diffuses the third color light, the rest of the first color light and the second color light, and the wavelength conversion element simultaneously emits, from the same area, the rest of the first color light, the second color light, and the third color light.

\* \* \* \* \*